United States Patent

Tanigawa et al.

[11] Patent Number: 5,956,392
[45] Date of Patent: *Sep. 21, 1999

[54] PRIVATE BRANCH EXCHANGE APPARATUS

[75] Inventors: Yoshihiro Tanigawa, Kawasaki; Toshihiko Ikeno, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/625,923

[22] Filed: Apr. 1, 1996

Related U.S. Application Data

[63] Continuation of application No. 08/154,741, Nov. 18, 1993.

[30] Foreign Application Priority Data

Nov. 20, 1992 [JP] Japan ................................ 4-335088
Oct. 7, 1993 [JP] Japan ................................ 5-276130

[51] Int. Cl.⁶ .................................................. H04M 15/00
[52] U.S. Cl. ........................................................ 379/137
[58] Field of Search ................................ 379/111, 112, 379/113, 115, 133, 137, 219, 220, 221, 231–236, 337, 157, 279, 198, 265, 266, 309

[56] References Cited

U.S. PATENT DOCUMENTS

| | | | |
|---|---|---|---|
| 4,319,090 | 3/1982 | Garwood | 379/113 |
| 4,497,978 | 2/1985 | Schoute | 379/279 |
| 4,511,762 | 4/1985 | Stockdale | 379/279 |
| 4,626,624 | 12/1986 | Daisenberger | 379/137 |
| 4,790,005 | 12/1988 | Hanselka | 379/113 |
| 4,860,344 | 8/1989 | Jans | 379/137 |
| 4,896,350 | 1/1990 | Bicknell | 379/220 |
| 4,907,256 | 3/1990 | Higuchi | 379/113 |
| 4,931,941 | 6/1990 | Krishnan | 379/220 |
| 4,959,854 | 9/1990 | Cave | 379/157 |
| 4,974,256 | 11/1990 | Cyr | 379/113 |
| 4,984,264 | 1/1991 | Katsube | 379/220 |
| 5,068,892 | 11/1991 | Livanos | 379/220 |
| 5,214,688 | 5/1993 | Szlam et al. | 379/112 |
| 5,251,254 | 10/1993 | Tanigawa | 379/165 |
| 5,291,552 | 3/1994 | Kerrigan et al. | 379/220 |
| 5,299,259 | 3/1994 | Oho | 379/221 |
| 5,325,426 | 6/1994 | Held | 379/337 |
| 5,557,668 | 9/1996 | Brady | 379/266 |

FOREIGN PATENT DOCUMENTS

| | | |
|---|---|---|
| 56-122293 | 9/1981 | Japan . |
| 59-132295 | 7/1984 | Japan . |
| 64-10798 | 1/1989 | Japan . |

*Primary Examiner*—Vijay Shankar
*Attorney, Agent, or Firm*—Morgan & Finnegan LLP

[57] ABSTRACT

A private branch exchange apparatus which encloses a plurality of external lines and a plurality of extensions including a discriminating circuit to discriminate the number of calls which are being executed and a refusing circuit to refuse a reception call when it is discriminated by the discriminating circuit that the number of calls which are being executed is equal to or larger than a predetermined value such as 1.

19 Claims, 10 Drawing Sheets

| EXTERNAL Bch NUMBER | TRANK NAME AND Bch NUMBER | | EXTERNAL LINE CALL STATE |
|---|---|---|---|
| 1 | COT1 | B1 | IN USE |
| 2 | COT2 | B1 | IN USE |
| 3 | BRT1 | B1 | IN USE |
| 4 | BRT1 | B2 | IN USE |
| 5 | BRT2 | B1 | FREE |
| 6 | BRT2 | B2 | IN USE |

| REGISTRATION NUMBER | EMERGENCY NUMBER |
|---|---|
| 1 | 110 |
| 2 | 119 |
| 3 | - |
| ⋮ | ⋮ |

FIG. 11

| EXTERNAL Bch NUMBER | TRANK NAME AND Bch NUMBER | | EXTERNAL LINE CALL STATE |
|---|---|---|---|
| 1 | COT1 | B1 | IN USE |
| 2 | COT2 | B1 | IN USE |
| 3 | BRT1 | B1 | FREE |
| 4 | | B2 | IN USE |
| 5 | PRT | B1 | IN USE |
| 6 | | B2 | FREE |
| 7 | | B3 | IN USE |
| ⋮ | | ⋮ | ⋮ |
| 27 | | B23 | IN USE |
| 28 | | B34 | UNUSABLE |

FIG. 10

PRIVATE BRANCH EXCHANGE APPARATUS

This is a continuation of co-pending application Ser. No. 08/154,741, filed on Nov. 18, 1993.

BACKGROUND OF THE INVENTION

1. Field of the Invention

The invention relates to a private branch exchange apparatus which encloses therein a plurality of external lines and a plurality of extensions.

2. Related Background Art

Hitherto, various kinds of telephone exchange apparatuses such as private branch exchange (PBX), main apparatus in a key telephone apparatus, and the like have been provided. In such a kind of apparatus, a connection control at the time of reception or transmission between a plurality of external lines and extension telephones or the like is executed. However, in the case where a new call is received from the external line, the telephone of the extension is rung, thereby informing the reception.

In the above conventional apparatus, however, since all of the receptions are made effective, for example, in the case where the number of persons who pick up the handset is very small because of the going-out or the like, there is a problem such that it is impossible to respond to the reception and the partner who dialed the telephone listens to a ring back tone for a long time, so that he will consider that nobody is there.

In the case where the conventional private branch exchange is congested and all of the external lines are busy because they are in use, even when an emergency situation occurs, it is impossible to transmit from the external line to a police station (dial number is set to 110), a fire station, emergency medical situation (dial number 119), or the like, so that the user must wait until a free external line is found out.

Figure 4:
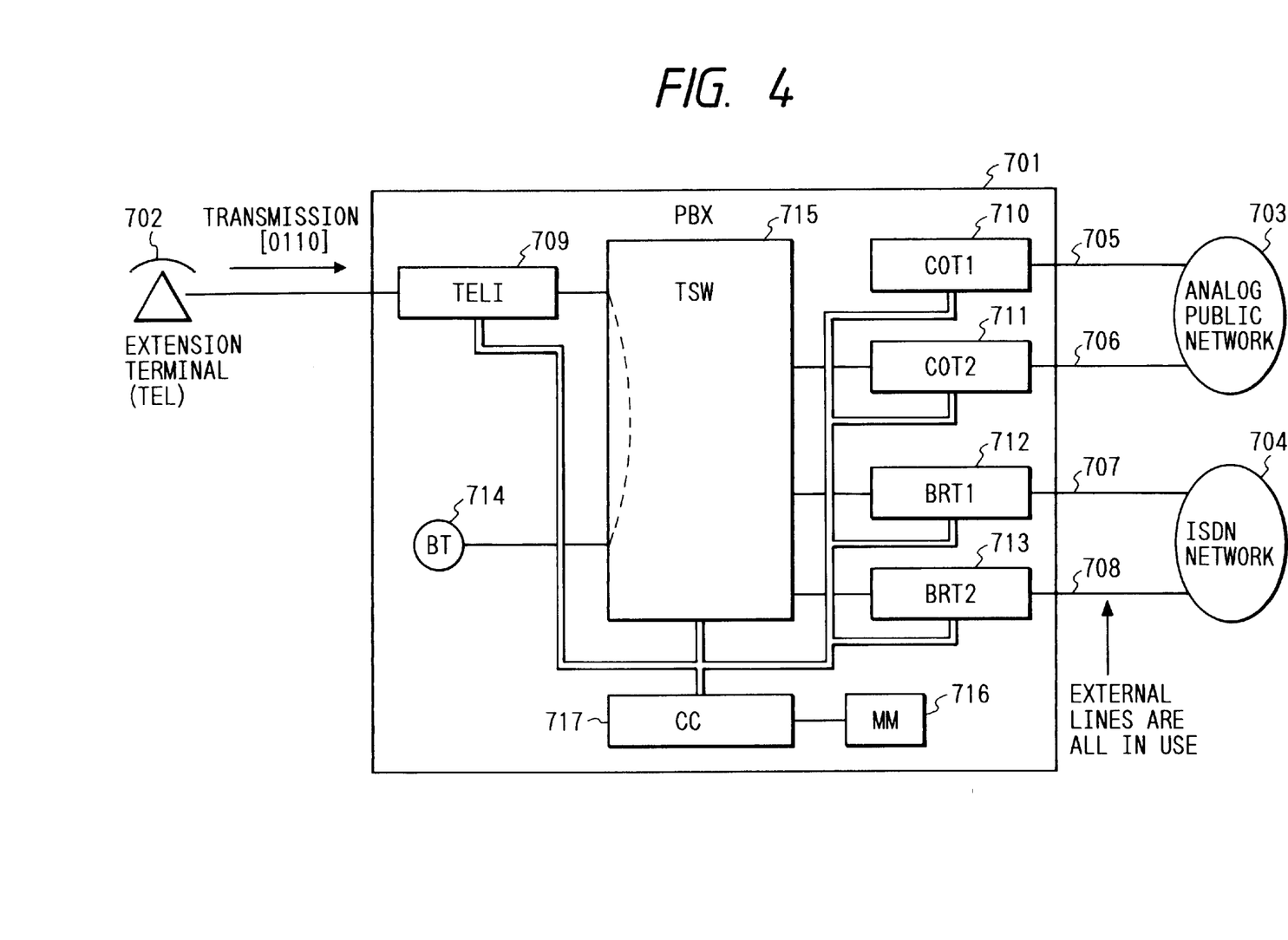
FIG. 4 is a block diagram showing a conventional private branch exchange.
Figure 5:
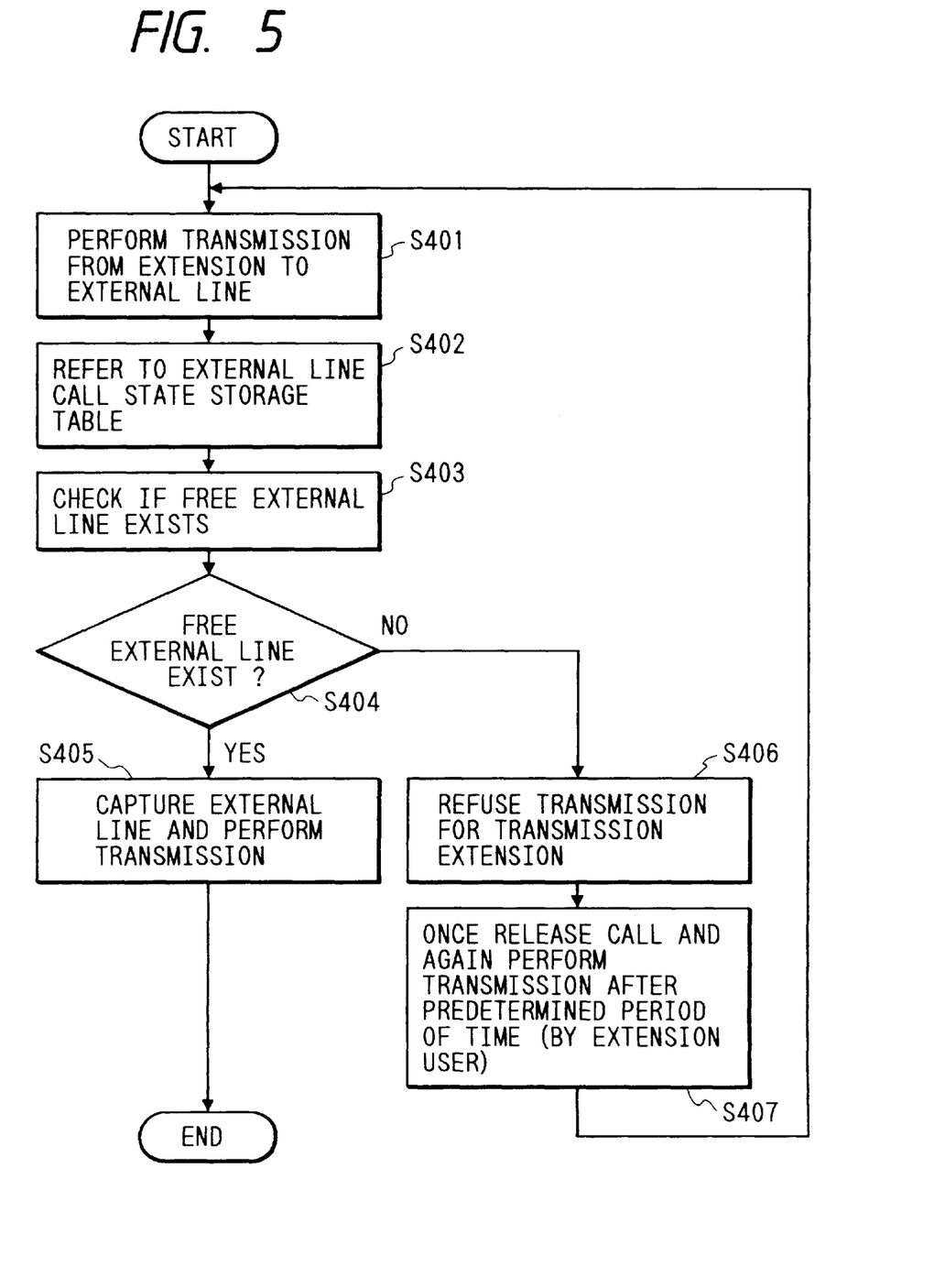
FIG. 5 is a flowchart for explaining a flow of the conventional transmitting procedure.

FIG. 4 is a block diagram of a private branch exchange for explaining a transmitting procedure in the conventional private branch exchange (PBS). FIG. 5 is a flowchart for explaining a flow of the transmission procedure.

In FIG. 4, an extension terminal (TEL) 702 is connected to an extension of a private branch exchange (PBX) 701. Analog lines 705 and 706 from an analog public network 703 and ISDN lines 707 and 708 from an ISDN network 704 are connected to the external line.

The PBX 701 comprises: a TEL extension interface device (TELI) 709 to interface with the TEL 702; an analog line interface device (COT1) 710 to interface with the analog public network 703 as a connecting section with the analog line 705; an analog line interface device (COT2) 711 to interface with the analog public network 703 as a connecting section with the analog line 706; an ISDN line interface device (BRT1) 712 to interface with the ISDN network 704 as a connecting section with the ISDN line 707; an ISDN line interface device (BRT2) 713 to interface with the ISDN network 704 as a connecting section with the ISDN line 708; a busy tone sound source (BT) 714; a speech communication path switch (TSW) 715 to connect an audio channel; a main memory device (MM) 716 having an external call state storage table to store a call state of the external line; and a control circuit (CC) 717 for controlling the whole PBX 701 and executing a reception control and a transmission control.

In the above system, it is now assumed that an emergency situation occurs and the partner's telephone number "0110" is dialed and a call is transmitted in order to inform a warning to the police from the TEL 702 of the extension (step S401 in FIG. 5).

The first number "0" of the dial No. "0110" indicates the external line transmission special number and is the number which is added when transmitting from the extension to the external line. The remaining numbers "110" indicate the telephone number of the police. When there is a transmission from the TEL 702, the TELI 709 detects the transmission and informs the transmission to the CC 717. The subsequent procedure slightly differs in dependence on whether the TEL 702 is a terminal to transmit by sending the dial numerals one digit by one like an analog single telephone (divisional transmission) or a terminal which transmits by sending all of the dial numerals in a lump like an ISDN terminal (batch transmission).

The case where the TEL 702 is a terminal which performs the divisional transmission will now be described. When the TEL 702 is a terminal which performs the divisional transmission, the CC 717 knows that the transmission is an external line transmission at the state of the reception of the first numeral "0" and checks to see if there is a free external line or not with reference to the external line call state storage table in the MM 716 in order to decide the external line which transmits (S402, S403). The CC 717 takes either one of the following procedures (1) and (2) in accordance with the state of the external line call state storage table.

(1) When there is a free external line (S404), one of the external lines which transmits is selected from among the free external lines and the selected external line is captured and the external line transmission is executed (S405).

(2) When there is no free external line (S404), the TSW 715 is controlled, the TEL 702 and BT 714 of the extension which transmitted are connected, the TEL 702 is allowed to listen to a busy tone, and a fact that the transmission was refused because all of the external lines are busy is notified (S406).

The case where the TEL 702 is a terminal which executes the batch transmission will now be described. When the TEL 702 is a terminal which executes the batch transmission, the CC 717 analyzes the dial numerals and knows that the transmission is an external line transmission with reference to the first numeral "0" and checks to see if there is a free external line or not with reference to the external line call state storage table in the MM 716 in order to determine the external line which transmits (S402, S403). The CC 717 takes either one of the following procedures (1) and (2) in accordance with the state of the external line call state storage table.

(1) When there is a free external line (S404), one of the external lines which transmits is selected from among the free external lines and the selected external line is captured and the external line transmission is executed (S405).

(2) When there is no free external line (S404), a fact that all of the external lines are busy and the transmission was refused is informed to the TEL 702 (S406).

Figure 6:
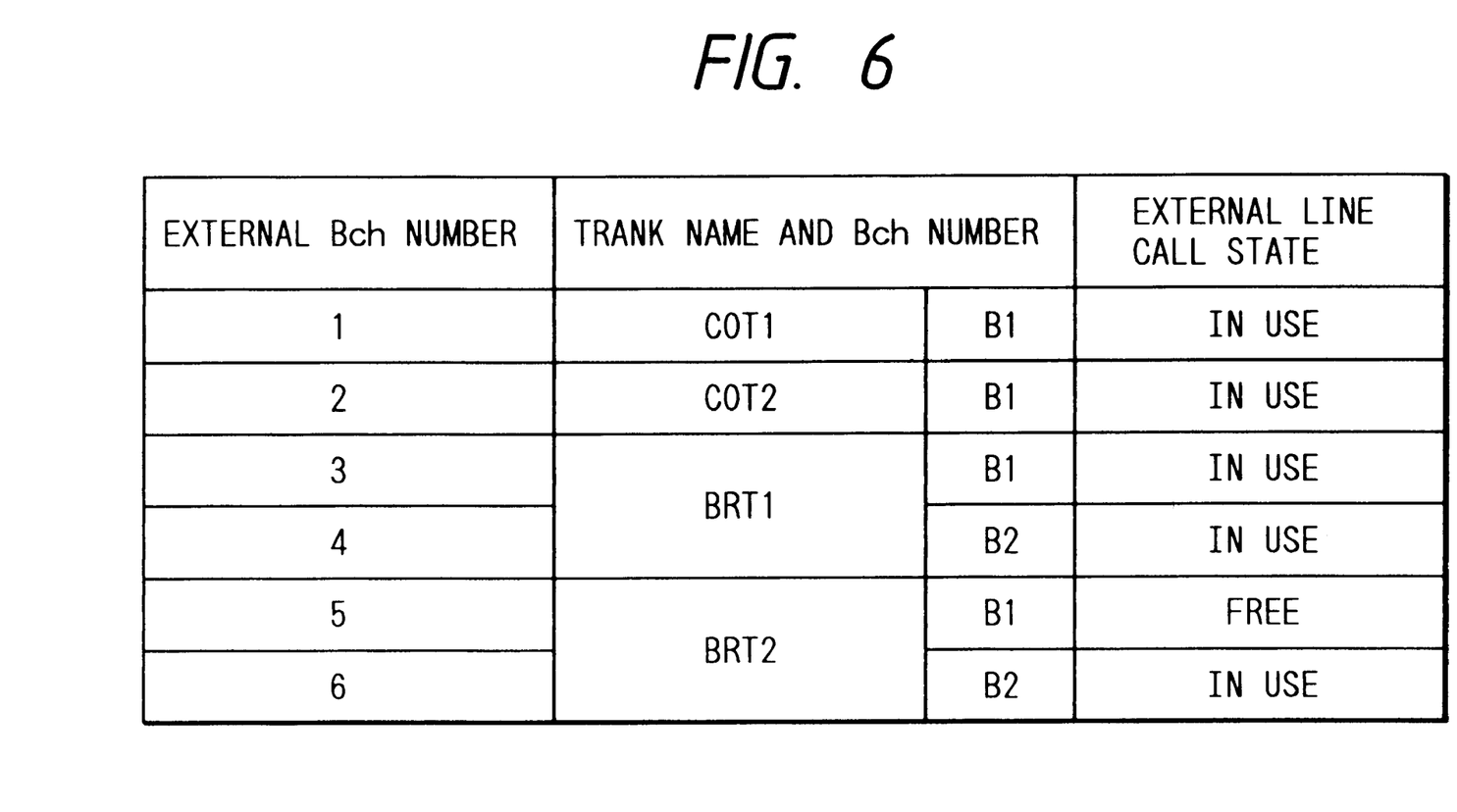
FIG. 6 is a diagram showing an external line call state storage table which is used in the third embodiment of the invention.

FIG. 6 is a diagram showing a structure of the external line call state storage table. It is now assumed that there is no free external line and the transmission was refused to the TEL 702.

When the transmission is refused, the TEL 702 once releases the call. However, since an emergency situation occurs, the partner's number "0110" is redialed and the transmission is performed (S407). The PBX 701 refuses the transmission until a free external line is found out. The TEL 702 continues the transmission until the external line transmission can be executed.

When the call of the external line is soon released and the free external line is found out, the CC 717 rewrites the value of the external line call state storage table to the free state from the in-use state. It is now assumed that a free line occurs in the B1 channel of the ISDN line 708.

When the call of the ISDN line 708 is released, the BRT 713 detects the call release and notifies to the CC 717. When the release notification is received, the CC 717 rewrites the value corresponding to the B1 channel of the ISDN line 708 in the external line call state storage table to the free state from the in-use state and controls the BRT 713 and executes the call releasing process.

It is assumed that the TEL 702 dials the partner's number "0110" and transmits just after the call release. When the TEL 702 transmits, the TELI 709 detects the transmission and notifies the transmission to the CC 717. When the transmission notification is received, the CC 717 analyzes the partner's number and knows that the transmission is the external line transmission.

The CC 717 subsequently searches the free external line with reference to the external line call state storage table in the MM 716 in order to decide the external line which transmits. When the CC 717 knows that there is a free line in the B1 channel of the ISDN line 708, the B channel is captured and the value corresponding to the B1 channel of the ISDN line 708 in the external line call state storage table is rewritten to the in-use state from the free state. The B channel is captured, the BRT 713 corresponding to the ISDN line 708 is controlled, and the transmission is performed to the ISDN network 704. The partner's number (reception number) in this instance is equal to "110".

After that, when the partner responds, the CC 717 controls the TSW 715 and connects the TEL 702 of the extension and the ISDN line 708 of the external line. When the TSW 715 is connected, a speech communication between the TEL 702 and the ISDN line 708 is started.

However, in the above conventional apparatus, in the case where an emergency situation occurs and the external line transmission for emergency is executed from the extension terminal, so long as all of the external lines are in use, the external line transmission cannot be immediately executed and the user of the extension terminal must transmit many times until a free external line is found out, so that it is very inconvenient.

SUMMARY OF THE INVENTION

It is an object of the invention to solve the problems of the conventional private branch exchange apparatus.

Another object of the invention is to provide a private branch exchange apparatus which prevents that a call generation person waits for a long time.

Still another object of the invention is to provide a private branch exchange apparatus which refuses a call reception in the case where the number of external lines or extensions in use is large.

Further another object of the invention is to prevent that the call generation cannot be performed to a partner of a high emergency in a police station, a fire station, or the like.

Further another object of the invention is to inhibit the call generation to persons other than a special person in the case where the number of external lines in use is large.

The above and other objects and features of the present invention will become apparent from the following detailed description and the appended claims with reference to the accompanying drawings.

DETAILED DESCRIPTION OF THE PREFERRED EMBODIMENTS

Figure 1:
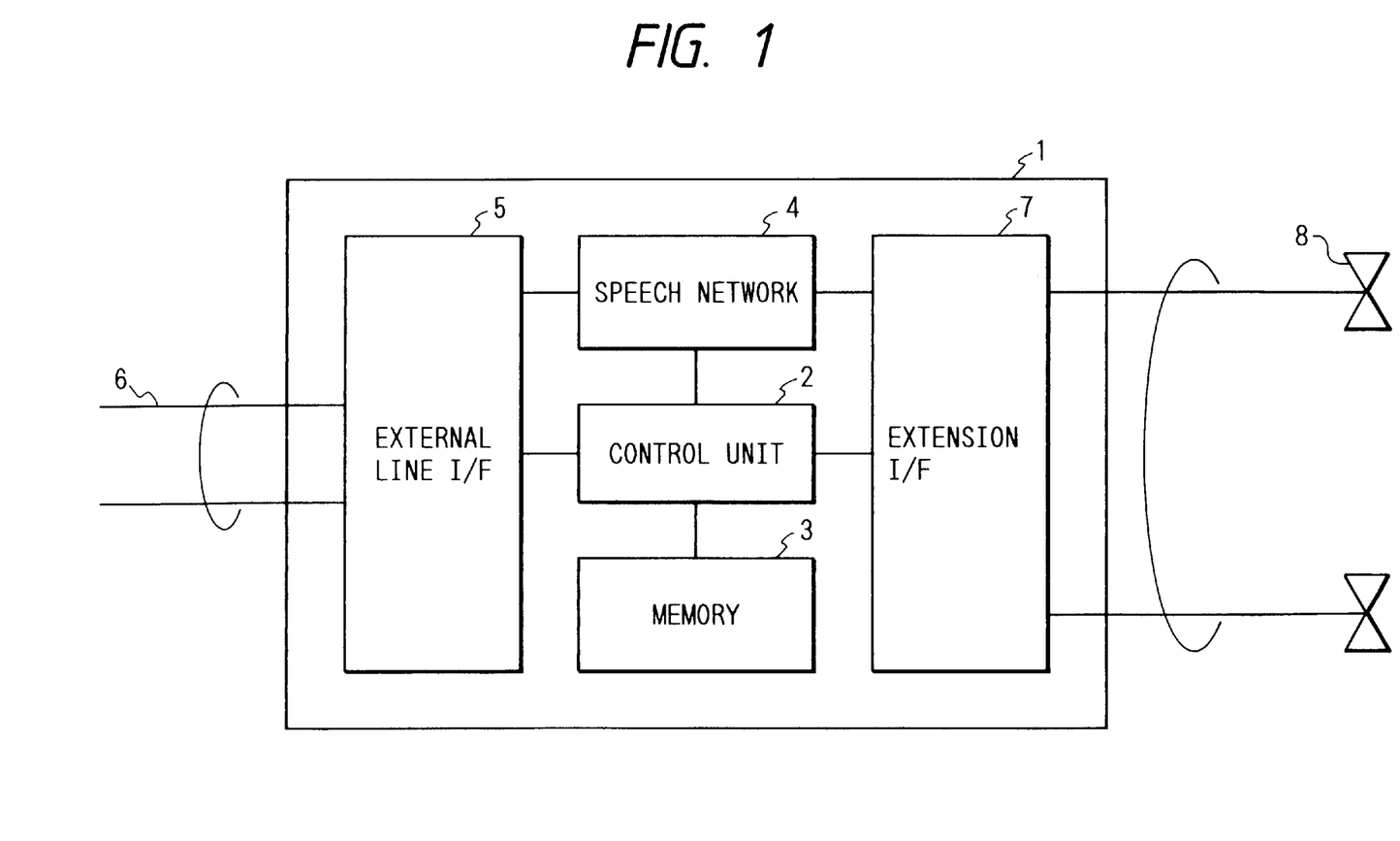
FIG. 1 is a block diagram showing the first embodiment of the invention.

FIG. 1 is a block constructional diagram showing the first embodiment of the invention.

In a private branch exchange apparatus according to the first embodiment, a plurality of ISDN external lines 6 and a plurality of extension telephones 8 are connected to a main apparatus 1 to control the whole apparatus.

The main apparatus 1 comprises: a control unit 2 to control the main apparatus 1; a memory 3 to store various kinds of data; a speech network 4 to connect external lines to a speech communication path such as an extension or the like; an external line interface 5 to execute the transmission or reception of a connection control message of an ISDN call; and an extension interface 7 to execute the detection of the operations of the telephones 8, the transmission of a reception ringing instruction, or the like.

Figure 2:
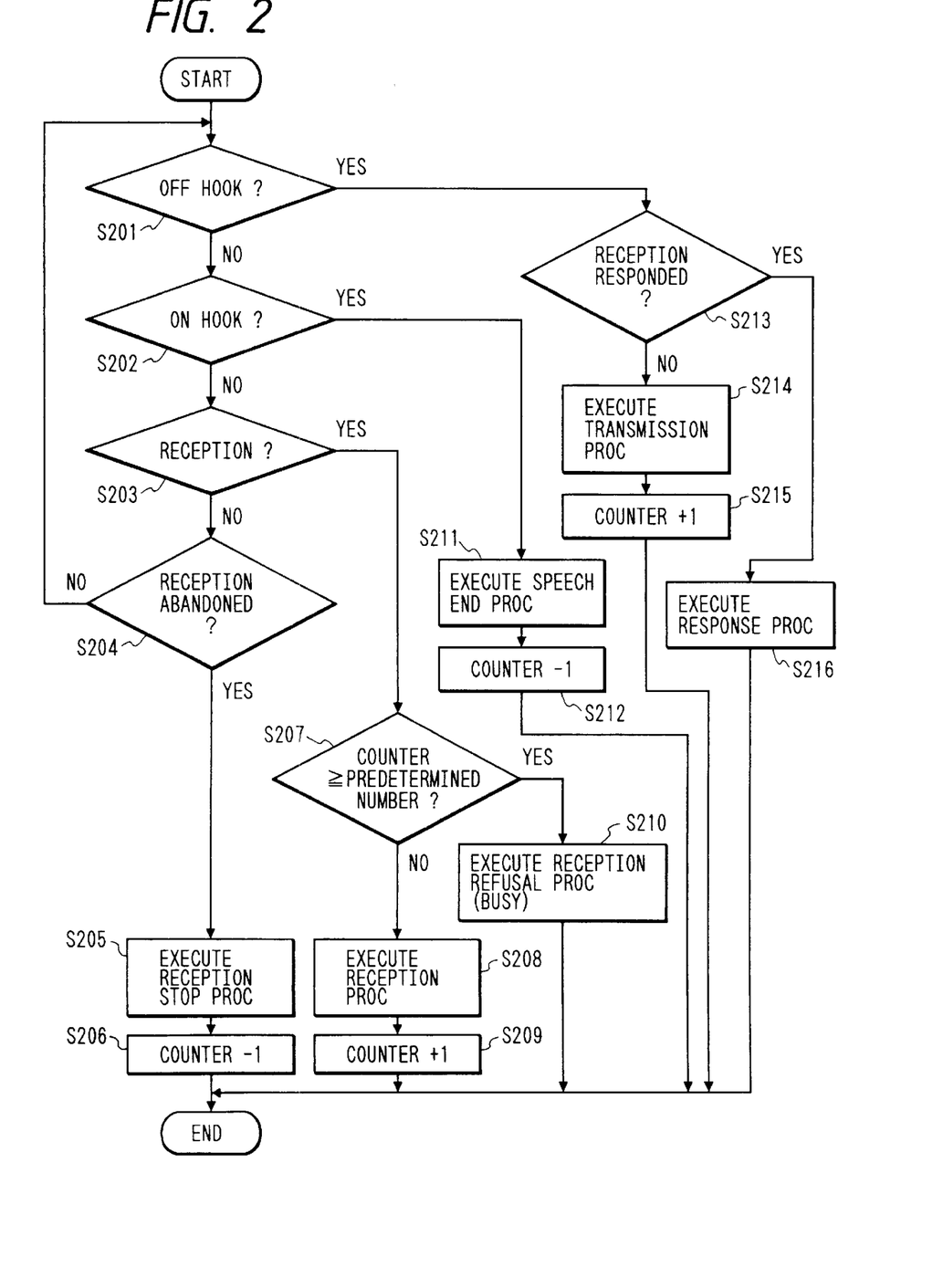
FIG. 2 is a flowchart showing the operation of the first embodiment.

FIG. 2 is a flowchart showing the operation of the control unit 2 in the first embodiment. The operation will now be described hereinbelow with reference to the drawings. It is assumed that the count value of a counter to indicate the number of external lines in use which is provided in the memory 3 has previously been cleared.

First, an offhook or onhook of each telephone 8 is monitored through the extension interface 7 and a reception signal and a reception abandonment signal from the external line are monitored through the external line interface 5 (S201 to S204).

When the offhook of the telephone 8 is detected (S201), a check is made to see if the offhook relates to a response to the reception or not (S213). In case of the response, a reception sound is stopped through the extension interface 7, a response signal is sent through the external line interface 5, the speech network 4 is controlled, and the speech communication path between the external line 6 and the telephone 8 is connected (response process: S216).

When it is not a response in step S213, the speech network 4 is controlled and dial tone is connected to the telephone 8 (transmission process: S214). The count value of the external line use counter in the memory 3 is increased by +1 (S215). In step S214, a call is generated from the external line interface in accordance with the telephone numbers inputted from the telephone 8.

When the onhook of the telephone 8 is detected (S202), a disconnection signal is transmitted through the external line interface 5, the speech network 4 is controlled, and the speech communication path between the external line 6 and the telephone 8 is disconnected (speech end process: S211). The count value of the external line use counter in the memory 3 is decreased by 1 (S212).

When the reception signal is detected from the external line interface 5 (S203), the control unit 2 judges the value of the external line use counter in the memory 3 (S207). When the count value is equal to or larger than a predetermined value, a reception refusal signal indicating that the line is busy is sent through the external line interface 5 (reception refusal process: S210). When the count value is less than the predetermined value, a call signal indicating that the operator is being called is sent through the external line interface 5 and a reception sound is rung to the telephone 8 through the extension interface 7 (reception process: S208). The count value of the external line use counter in the memory 3 is increased by +1 (S209).

In step S210, it is also possible that no response is made for a predetermined period of time without sending the reception refusal signal.

When the reception abandonment signal is detected (S204), the reception sound of the telephone 8 is stopped through the extension interface 7 (reception stop process: S205). The count value of the external line use counter in the memory 3 is decreased by 1 (S206).

In the above embodiment, the number of external lines in use has been counted. However, the number of external lines in a free state can be also counted. In this case, in step S207, when the count value is equal to the predetermined value (1 or more), the reception refusal process is executed. Upon external line reception, the count value of the external line use counter has been compared with the predetermined value. However, the count value can be also compared with, for example, the numerical value which changes in accordance with the time zone. It is sufficient that such a predetermined value can be set in accordance with the number of operators.

The second embodiment of the invention will now be described. In the first embodiment, the reception has been refused in accordance with the number of external lines in use. In the second embodiment, however, the reception is refused in accordance with the number of extensions in use.

Since a construction of an apparatus in the second embodiment is similar to that shown in FIG. 1 in the first embodiment, its description is omitted here. However, it is now assumed that a counter to indicate the number of extensions in-use is provided in the memory 3 in the second embodiment.

Figure 3:
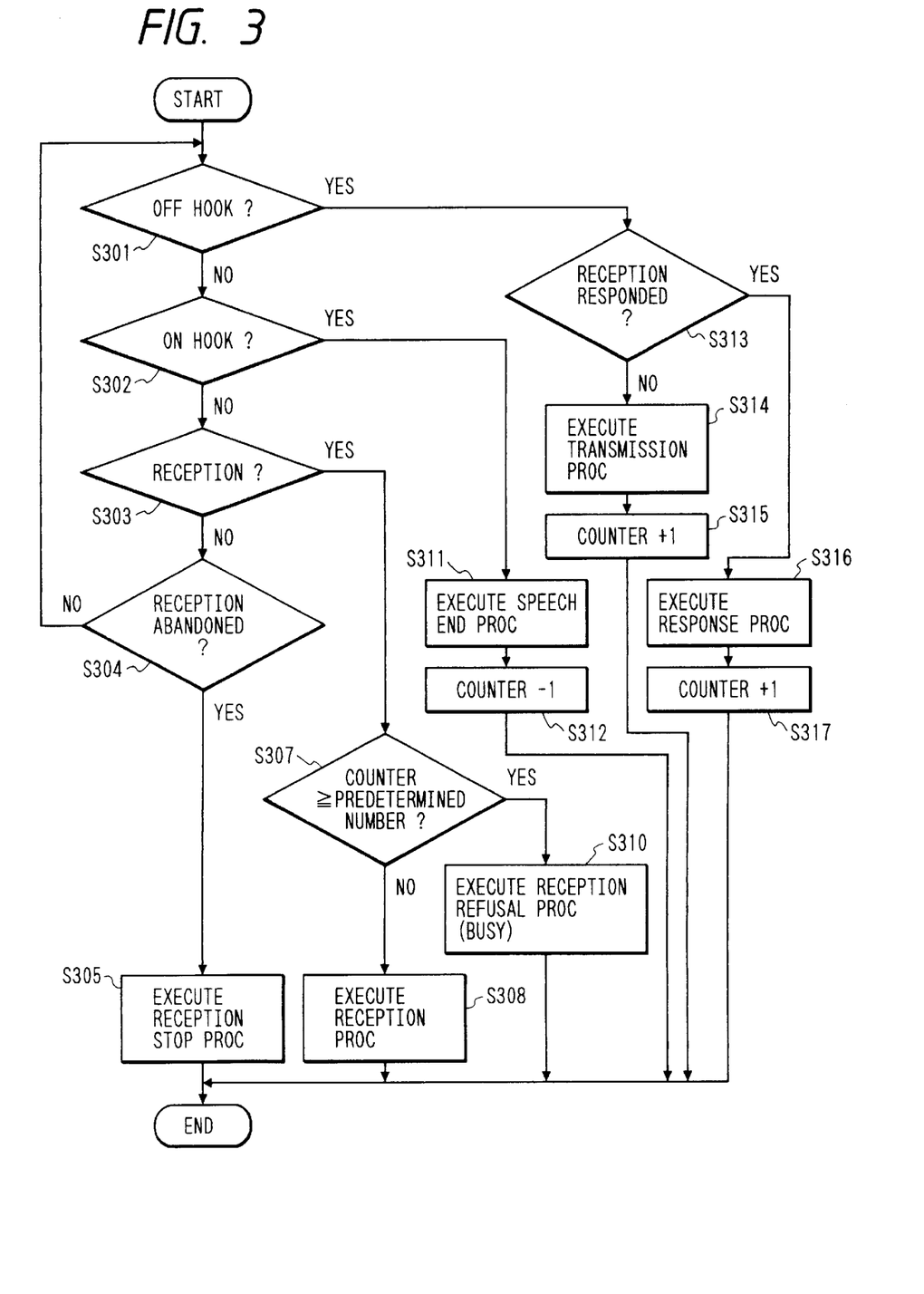
FIG. 3 is a flowchart showing the operation of the second embodiment of the invention.

FIG. 3 is a flowchart showing the operation of the control unit 2 in the second embodiment. The operation will now be described hereinbelow in accordance with the flowchart. It is now assumed that the count value of an extension use counter provided in the memory 3 has previously been cleared.

First, the offhook or onhook of the telephone 8 is monitored through the extension interface 7 and the reception signal and the reception abandonment signal from the external line are monitored through the external line interface 5 (S301 to S304).

When the offhook of the telephone 8 is detected (S301), a check is made to see if it relates to a response to the reception or not (S313). In case of the response, the reception sound is stopped through the extension interface 7. In case of the response to the reception from the external line, the response signal is transmitted through the external line interface 5, the speech network 4 is controlled, and the speech communication path between the external line 6 and the telephone 8 is connected. In case of the response to the reception from the extension, the speech network 4 is controlled and the speech communication path between the transmission telephone and the response telephone is connected. (Response process: S316). Further, the count value of the extension use counter in the memory 3 is increased by +1 (S317).

When it is not the response in step S313, the speech network 4 is controlled and the dial tone is connected to the telephone 8 (transmission process: S314). The count value of the extension use counter in the memory 3 is increased by +1 (S315). In step S314, the call generation is performed to the partner of the external line or extension designated from the telephone 8.

When the onhook of the telephone 8 is detected (S302), so long as the external line is busy, a disconnection signal is sent through the external line interface 5, the speech network 4 is controlled, and the speech communication path between the external line 6 and the telephone 8 is disconnected. When the extension is busy, the speech network 4 is controlled and the speech communication path is disconnected. (Speech end process: S311). The count value of the extension use counter in the memory 3 is decreased by 1 (S312).

When the reception signal is detected from the external line interface 5 (S303), the value of the extension use counter in the memory 3 is discriminated (S307). When the count value is equal to or larger than a predetermined value, the reception refusal signal indicating that the line is busy is sent through the external line interface 5 (reception refusal process: S310). When the count value is less than the predetermined value, the call signal is sent through the external line interface 5 and the reception sound is rung to the telephone 8 through the extension interface 7 (reception process: S308).

In step S310, a response signal is not transmitted for a predetermined period of time without sending the reception refusal signal.

When the reception abandonment is detected (S304), the reception sound of the telephone 8 is stopped through the extension interface 7 (reception stop process: S305).

In the above embodiment, the number of extensions in use has been counted. However, the number of extensions in free state can be also counted. In this case, when the count value is equal to the predetermined value (1 or more) in step S310, the reception refusal process is executed. Although the count value of the extension use counter has been compared with the predetermined value upon external line reception, for example, the count value can be also compared with the numerical value which changes in accordance with the time zone.

Upon extension transmission, the reception process is executed in accordance with whether the extension designated by the telephone 8 is free or in use irrespectively of the count value of the extension use counter.

The third embodiment relates to a PBX in which (n) of the B channels of the ISDN line of the external line are used as emergency channels and the (n) B channels are not used in the case other than the emergency external line transmission.

Figure 7:
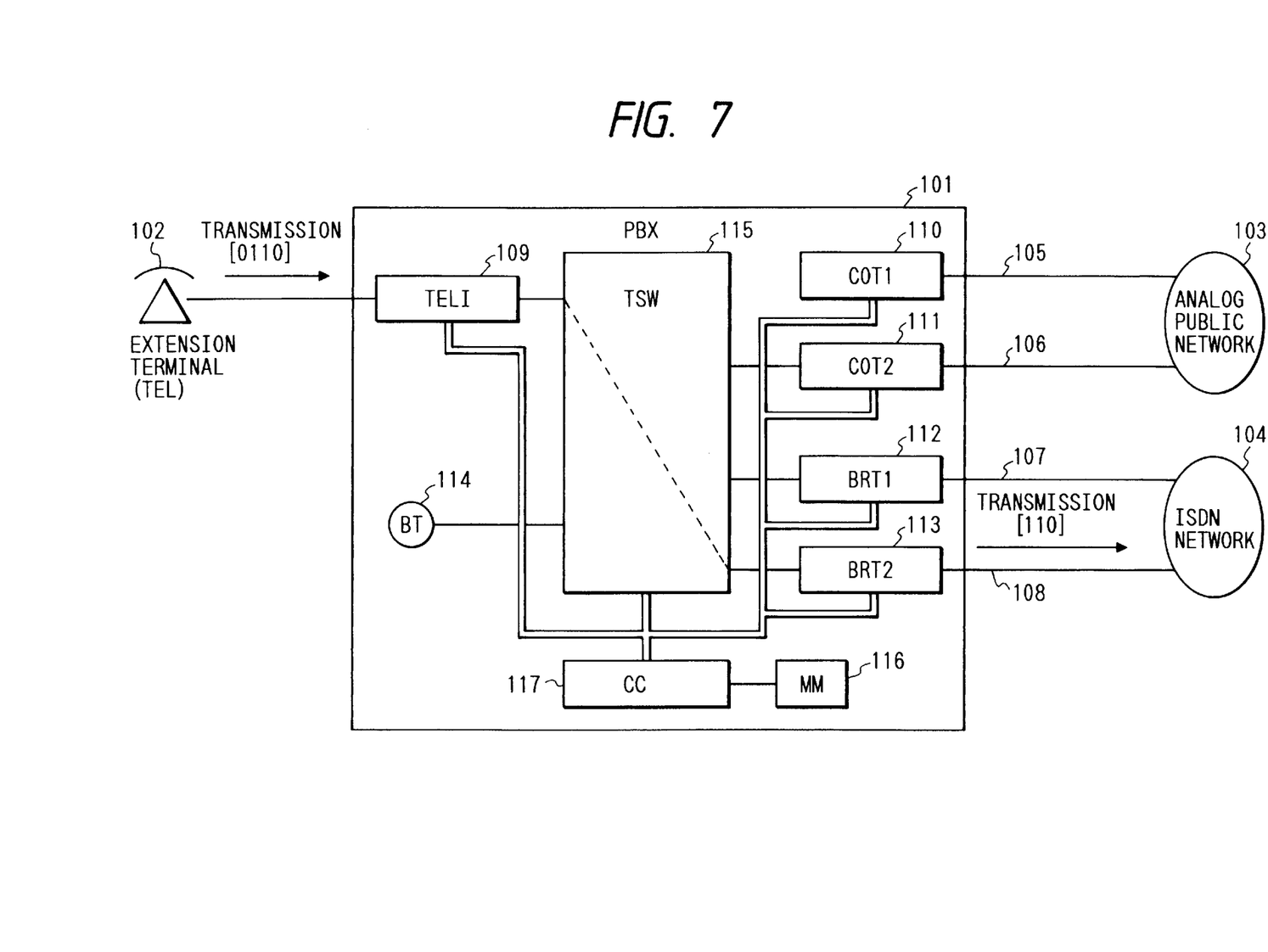
FIG. 7 is a block diagram showing the third embodiment.
Figure 8:
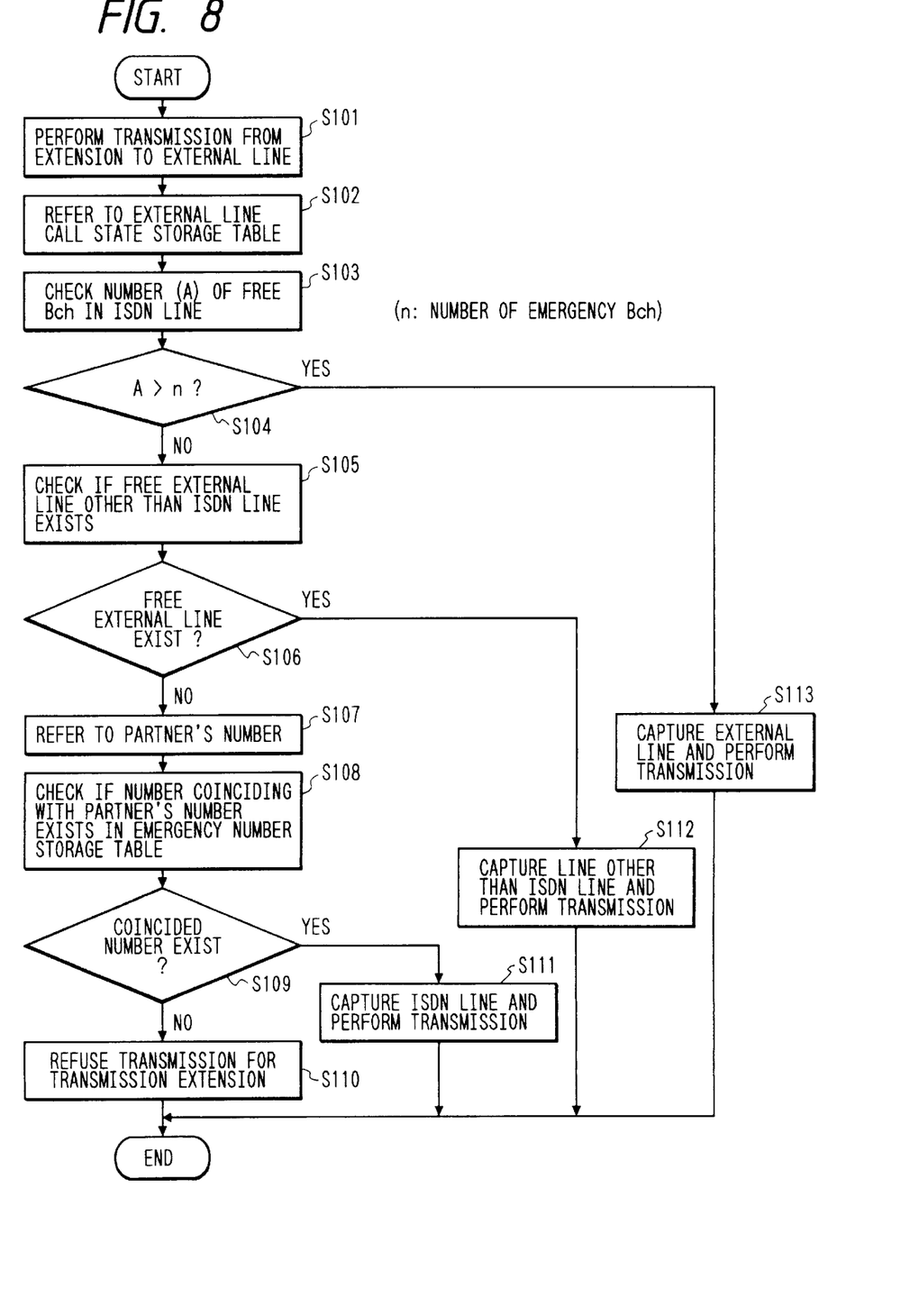
FIG. 8 is a flowchart showing the operation of the third embodiment.

FIG. 7 is a block diagram of the PBX for explaining the transmitting procedure in the third embodiment. FIG. 8 is a flowchart for explaining a flow of the transmitting procedure.

In FIG. 7, in a PBX 101, one of the B channels in all of the ISDN lines is used as an emergency channel and two numbers of "110" and "119" are used as emergency numbers.

An extension terminal (TEL) 102 is connected to an extension interface (TELI) 109 of the PBX 101. An analog public network 103 is connected to two analog line interfaces (COT1, COT2) 110 and 111 through analog lines 105 and 106. An ISDN network 104 is connected to two ISDN line interfaces (BRT1, BRT2) 112 and 113 through ISDN lines 107 and 108.

The PBX 101 comprises: a busy tone sound source (BT) 114; a speech communication path switch (TSW) 115 to connect an audio channel; a main memory device (MM) 116 having an external line call state storage table to store a call state of an external line and an emergency number storage table to store the emergency number; and a control circuit (CC) 117 which controls the whole PBX 101 and executes a reception control, a transmission control, and the like.

In FIG. 7, it is now assumed that an emergency situation occurred and the external line transmission special number "0" and the partner's numbers "110" were dialed and the external line transmission was executed in order to notify to the police station from the TEL 102 of the extension. When there is a transmission from the TEL 102, the TELI 109 detects the transmission and notifies the transmission to the CC 117. The subsequent procedure slightly differs in accordance with whether the TEL 102 is a terminal which transmits by sending the dial numbers one digit by one like an analog single telephone (divisional transmission) or a terminal which transmits by sending all of the dial numbers in a lump like an ISDN terminal (batch transmission).

First, the case where the TEL 102 is a terminal which performs the divisional transmission will now be described. When the TEL 102 is a terminal which performs the divisional transmission, the CC 117 knows the external line transmission at the stage of the reception of the first numeral "0" (S101) and refers to the external line call state storage table in the MM 116 (S102) and checks the number of free B channels of the ISDN line (S103) in order to determine the external line which transmits. It is now assumed that the external line call state storage table 800 has a structure as shown in FIG. 6.

The CC 117 takes either one of the following procedures (1) to (4) in accordance with the state of the external line call state storage table. The number n of B channels for emergency is set to "1".

(1) When there is no free external line, the TSW 115 is controlled and the BT is sent to the extension terminal which transmitted (not shown).

(2) When there is one free B channel of the ISDN line (S104) and the external lines (in this case, the analog lines 105 and 106) other than the ISDN line are not free (S105, S106), the external line call state of the free B channel of the ISDN line in the external line call state table is rewritten to the in-use state, thereby temporarily capturing the free B channel of the ISDN line. When the dial number which is received after that is the emergency number (S107 to S109), the B channel of the ISDN line which has already temporarily been captured is captured and the external line transmission is executed (S111).

(3) When there is one free B channel of the ISDN line (S104) and there is no external line other than the ISDN line (S105, S106), the free B channel of the ISDN line is temporarily captured. When the dial number which is received after that is not the emergency number (S107 to S109), the B channel of the ISDN line which has already temporarily been captured is released and the transmission is refused (S110.

(4) In the case other than the above cases (namely, when the number of free B channels of the ISDN line is equal to or larger than 2 or where there is a free external line other than the ISDN line), the B channel of the external line is selected so as not to select the last one of the free B channels of the ISDN line, the selected B channel is captured, and the external line transmission is performed (S112, S113).

For example, it is now assumed that in the above situation (2), only the B1 channel of the ISDN line 108 is free and the B channels of the other external lines are in use. The CC 117 refers to the external line call state storage table. When the CC 117 knows that there is one free B channel in all of the ISDN lines and that there is no free external line other than the ISDN line, the B1 channel of the ISDN line 108 is selected and is temporarily captured, the value corresponding to the selected B channel in the external line call state storage table is rewritten to the in-use state from the free state. The apparatus waits for the subsequent dial numbers.

Figure 9:
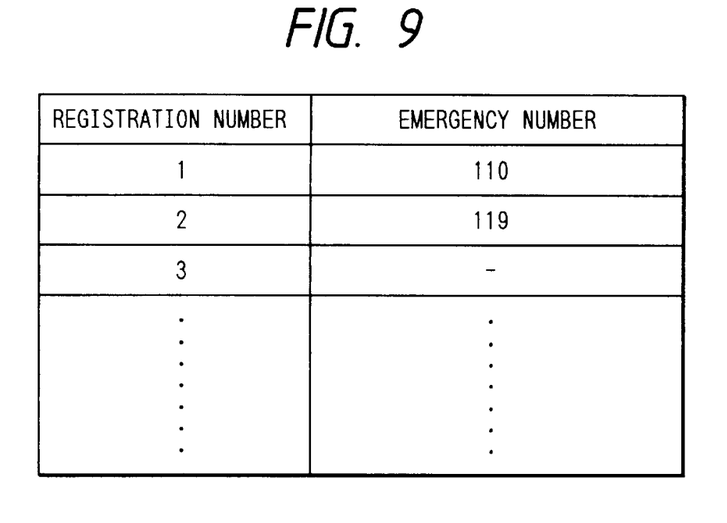
FIG. 9 is a diagram showing an emergency number storage table which is used in the third embodiment.

After that, the CC 117 checks whether the number which is external line transmitted coincides with the number stored in the emergency number storage table or not each time one digit of the dial numbers is received from the TEL 102. It is now assumed that the emergency number storage table 802 has a structure as shown in FIG. 9. The emergency numbers are not limited to the numbers for the police station and fire station but also include the numbers for a security company and the like.

When the CC 117 analyzes that the transmission is not the emergency transmission at the stage when several numbers are received, the CC 117 controls the TSW 115 and connects the BT 114 and the extension which transmitted and sends a busy tone, thereby notifying the refusal of the transmission to the person who transmitted.

When the CC 117 analyzes that the transmission is an emergency transmission at the stage of the reception of all of the numbers, the CC 117 controls the captured BRT 113 and controls the TSW 115 and connects the audio channel between the extension which transmitted and the external line which transmitted. After that, when the partner responds, the speech communication is started.

The case where the TEL 102 is a terminal which executes the batch transmission will now be described. When the TEL 102 is a terminal which performs the batch transmission, the CC 117 analyzes the dial numbers and refers to the first numeral "0" and knows the external line transmission (S101). In order to determine the external line which transmits, the CC 117 refers to the external line call state storage table in the MM 116 (S102).

The CC 117 takes either one of the following procedures (1) to (4) in accordance with the state of the external line call state storage table.

(1) When there is no free external line, the transmission is refused to the extension terminal which transmitted (not shown).

(2) When there is one free B channel of the ISDN line (S103, S104) and the external lines (analog lines 105 and 106 in this case) other than the ISDN line are not free (S106, S107), the subsequent numerals are analyzed. When either one of the numerals coincides with the emergency number (S108, S109), the free B channel of the ISDN line is captured and the external transmission is executed (S111).

(3) When there is one free B channel of the ISDN line (S103, S104) and there is no free external line other than the ISDN line (S106, S107), the subsequent numerals are analyzed. When none of the numerals coincides with the emergency number (S108, S109), the transmission is refused to the extension terminal which transmitted (S220).

(4) In the case other than the above cases (namely, when the number of free B channels of the ISDN line is equal to or larger than 2 or where there is a free external line other than the ISDN line), the B channel of the external line is selected so as not to select the last one of the free B channels of the ISDN line and the selected B channel is captured and the external transmission is executed (S112, S113).

As an example, it is now assumed that in the above situation of (2), only the B1 channel of the ISDN line 108 is free and the B channels of the other external lines are in use. The CC 117 refers to the external line call state storage table. When the CC 117 knows that there is one free B channel in all of the ISDN lines and that there is no free external line other than the ISDN line, the remaining dial numbers are analyzed to see if there is a number which coincides with the numbers stored in the emergency number storage table or not.

When the dial number is not the emergency number, the CC 117 controls the TELI 109 and refuses the transmission to the extension terminal 102 which transmitted. When the dial number coincides with the emergency number, the value corresponding to the last free B channel of the ISDN line is rewritten from the free state to the in-use state. The BRT 113 is controlled and the external line transmission is executed, the TSW 115 is controlled, and the audio channel between the extension which transmitted and the external line which transmitted is connected. When the partner responds after that, the speech communication is started.

A receiving procedure when there is a reception from the ISDN line will now be described. When there is a reception from the ISDN line 107, the BRT 112 detects the reception and notifies the reception to the CC 117. When the reception notification is received, the CC 117 refers to the external line call state storage table in the MM 116. When there are two or more free B channels of all of the ISDN lines, the reception is performed in accordance with a response method. When the number of free B channels of all of the ISDN lines is equal to or less than 1, in order to keep the free B channel in a state for emergency, the BRT 112 is controlled and the reception is refused.

As a modification of the embodiment, when the number of free B channels is two or more, the reception from a special person who transmitted or the reception to the special extension can be also permitted and, when the number of free B channels is equal to one, the reception can be also refused. It is also possible to construct in a manner such that even when the number of free channels is equal to 1, a special reception is permitted.

As another modification of the embodiment, it is also possible to construct in a manner such that when the number of free B channels is equal to 2 or more, the transmission is refused and, when it is equal to 1 or less, the reception is refused.

By the transmitting and receiving procedures as mentioned above, by keeping one B channel of the ISDN line in a state for the emergency external line transmission, even if the calls of the PBX are congested in case of the occurrence of an emergency situation, the external line transmission can be easily performed.

Figure 10:
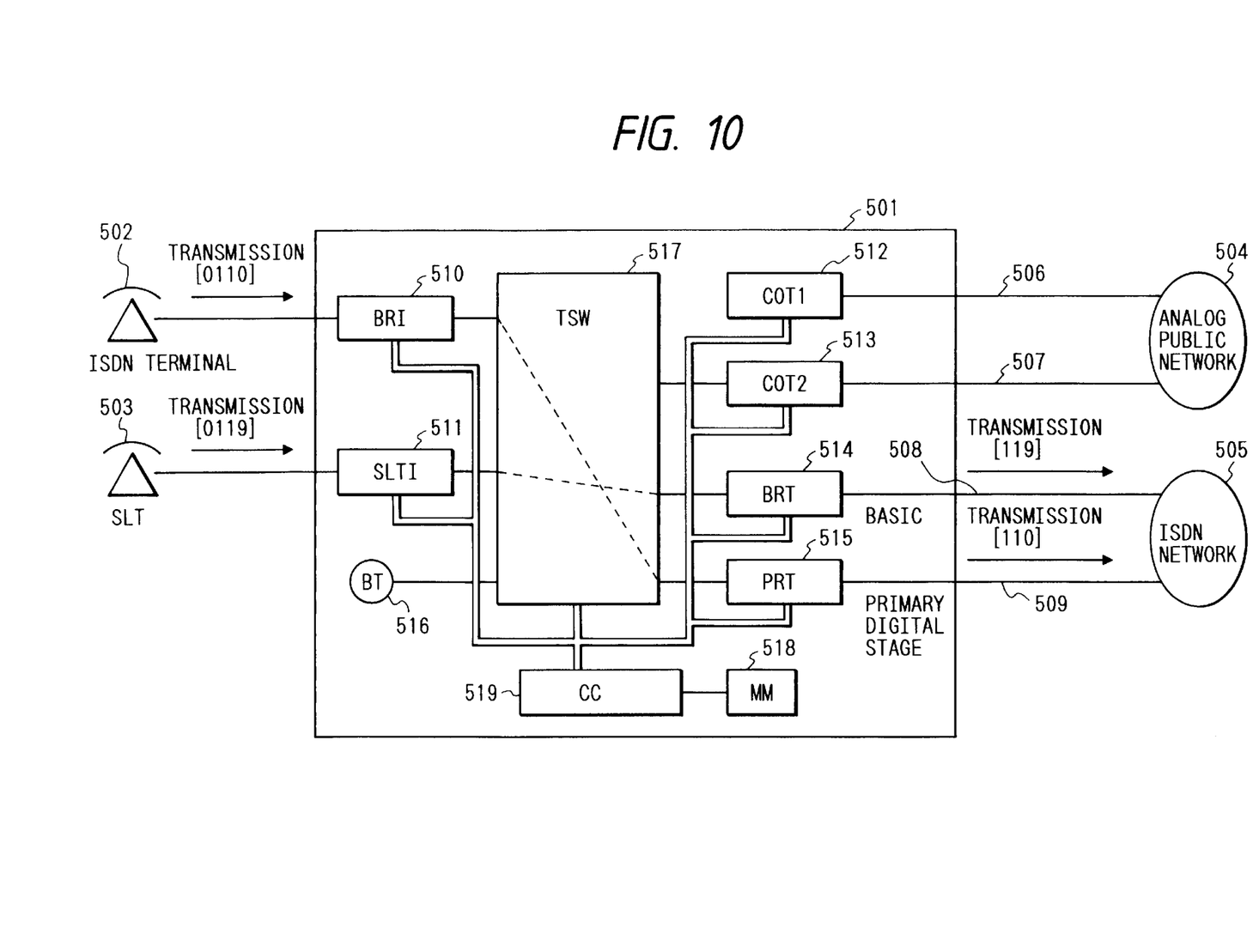
FIG. 10 is a block diagram showing the fourth embodiment of the invention.

The fourth embodiment of the invention will now be described. FIG. 10 is a block diagram of a PBX for explaining a transmitting procedure in the fourth embodiment.

In FIG. 10, a PBX 501 sets one B channel in all of the ISDN lines into an emergency channel and handles two numbers "110" and "119" as emergency numbers.

An ISDN terminal 502 is connected to an ISDN extension interface (BRI) 510 of the PBX 501. A single telephone (SLT) 503 is connected to an SLT extension interface (SLTI) 511. An analog public network 504 is connected to two analog line interfaces (COT1, COT2) 512 and 513 through analog lines 506 and 507. Further, an ISDN network 505 is connected to an ISDN basic line interface (BRT) 514 through an ISDN basic interface line 508. The ISDN network 505 is connected to an ISDN primary digital stage interface (PRT) 515 through an ISDN primary digital stage interface line 509.

The PBX 501 comprises: a busy tone sound source (BT) 516; a speech communication path switch (TSW) 517 to connect an audio channel; a main memory device (MM) 518 having an external line call state storage table to store a call state of an external line and an emergency number storage table to store the emergency telephone numbers; and a control circuit (CC) 519 which controls the whole PBX 501 and executes the reception control, transmission control, and the like.

A flow of a transmitting procedure in the fourth embodiment will now be described with reference to a flowchart of FIG. 8.

In FIG. 10, it is assumed that an emergency situation occurred and the external line transmission special number "0" and the partner's numbers "110" were dialed and the external line transmission was executed in order to notify from the ISDN terminal 502 of the extension to the police station. It is now assumed that the external line transmission special number "0" and the partner's numbers "119" were dialed and the external line transmission was performed at almost the same time as such as emergency external line transmission in order to call an emergency ambulance from the SLT 503 of the extension (S101).

Figure 11:
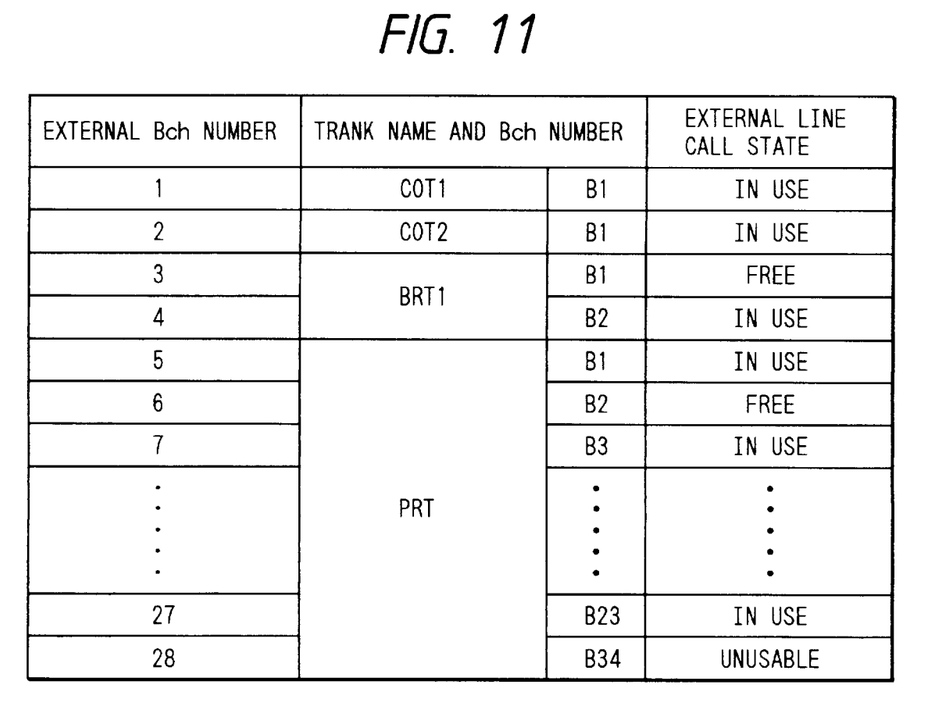
FIG. 11 is a diagram showing an external line call state storage table which is used in the fourth embodiment.

When there is a transmission from the LSDN terminal 502, the BRI 510 detects the transmission and notifies the transmission to the CC 519. When the transmission notification is received from the BRI 510, the CC 519 analyzes the dial numbers by observing the reception number information elements in the "call setting" message of the transmission. When the CC 519 knows that the first number is equal to "0" and the transmission is the external line transmission, the external line call state storage table in the MM 518 is referred in order to determine the external line which transmits (S102). The number of free B channels of the ISDN line is checked (S103). It is now assumed that the external line call state storage table 804 has a structure as shown in FIG. 11.

Subsequently, the CC 519 takes either one of the following procedures (1) to (4) in accordance ith the state of the external line call state storage table. It is now assumed that the number (n) of emergency B channels is equal to 2.

(1) When there is no free external line, the BRI 510 is controlled and the transmission is refused to the ISDN terminal 502 which transmitted (not shown).

(2) When the number of free B channels of the ISDN line is equal to one or two (S104) and the external lines (analog lines 506 and 507 in this case) other than the ISDN line are not free (S105, S106), the subsequent numbers are analyzed. When any one of the numbers coincides with the emergency number (S107 to S109), the free B channel of the ISDN line is captured and the external line transmission is executed (S111).

(3) When the number of free B channels of the ISDN line is equal to one or two (S104) and there is no external line other than the ISDN line (S105, S106), the subsequent numbers are analyzed. When none of the numbers coincides with the emergency number (S107 to S109), the BRI 510 is controlled and the transmission is refused to the ISDN terminal 502 which transmitted (S110).

(4) In the case other than the above cases (namely, the case where the number of free B channels of the ISDN line is equal to or larger than 2 or where there is a free external line other than the ISDN line), one or two B channels of the ISDN line are left and the other B channels are selected and the selected B channels are captured and the external line transmission is executed (S112, S113).

As an example here, it is now assumed that in the above situation (2), only the B1 channel of the ISDN basic interface line 508 and the B2 channel of the ISDN primary digital stage interface line 509 are free and that the other B channels are in use. The CC 519 refers to the external line call state storage table. When the CC 519 knows that there are two free B channels in all of the ISDN line and there is no free external line other than the ISDN line, the CC 519 analyzes the remaining dial numbers and checks to see if any one of the remaining dial numbers coincides with the numbers stored in the emergency number storage table or not. It is now assumed that the emergency number storage table has a structure as shown in FIG. 9.

When the dial number is not the emergency number, the CC 519 controls the BRI 510 and refuses the transmission to the ISDN terminal 502 which transmitted. When the dial number is the emergency number, either one of the free B channels of the ISDN line (B2 channel of the PRT 515 in this case) is selected and the selected B channel is captured and the value corresponding to the selected B channel in the external line call state storage table is rewritten to the in-use state from the free state. Further, the PRT 515 is controlled and the external line transmission is performed. The TSW 517 is controlled and the audio channel between the extension which transmitted and the external line which transmitted is connected. After that, when the partner responds, the speech communication is started.

It is now assumed that before the state of the external line is changed just after there was the transmission for emergency from the ISDN terminal 502, the numbers "0110" and "0119" were dialed and the external line transmission was executed from the SLT 503. When there is a transmission from the SLT 503, in the PBX 501, the SLTI 511 detects the transmission, the SLTI 511 receives the dial numbers one digit by one from the SLT 503, and the received dial numbers are informed to the CC 519.

When the first number "0" is first received, the CC 519 knows that the transmission is the external line transmission (S101) and refers to the external line call state storage table in the MM 518 in order to determine the external line which transmits (S102).

The CC 519 subsequently takes either one of the following procedures (1) to (4) in accordance with the state of the external line call state storage table. It is now assumed that the number (n) of emergency B channels is set to 2.

(1) When there is no free external line, the TSW 517 is controlled and the BT is transmitted to the SLT 503 which transmitted (not shown).

(2) When the number of free B channels of the ISDN line is equal to 1 or 2 (S103, S104) and the external lines (analog lines 506 and 507 in this case) other than the ISDN line are not free (S106, S107), one of the free B channels of the ISDN line is temporarily captured. After that, when any one of the received dial number is the emergency number (S108, S109), the B channel of the ISDN line which has already temporarily been captured is captured and the external line transmission is executed (S111).

(3) When the number of free B channels of the ISDN line is equal to 1 or 2 (S103, S104) and there is no free external line other than the ISDN line (Sl05, S106), one of the free B channels of the ISDN line is temporarily captured. When none of the dial numbers which are received after that is not the emergency number (S107 to S109), the B channel of the ISDN line which has already temporarily been captured is released and the TSW 517 is controlled and the BT is sent to the SLT 503 which transmitted (S110).

(4) In the case other than the above cases (namely, the case where the number of free B channels of the ISDN line is equal to or larger than 3 or where there is a free external line other than the ISDN line), one or two B channels of the ISDN line are left and the other B channels are selected and the selected B channels are captured and the external line transmission is executed (S112, S113).

As an example here, it is now assumed that in the above situation (2), only the B1 channel of the ISDN basic interface line 508 is free and that the other B channels are in use. The CC 519 refers to the external line call state storage table. When the CC 519 knows that there is one free B channel in all of the ISDN lines and that there is no free external line other than the ISDN line, the free B channel (B1 channel of the BRT) is temporarily captured. The value corresponding to the selected B channel in the external line call state storage table is rewritten into the in-use state from the free state. The apparatus waits for the reception of the subsequent dial numbers.

After that, each time one digit of the dial numbers is received from the SLT 503, the CC 519 checks to see if the number which is transmitted via the external line coincides with the number stored in the emergency number storage table or not.

When the CC 519 analyzes that the transmission is not the emergency transmission at the stage at which several numbers are received, the CC 519 controls the TSW 517 and connects the BT 516 and the extension which transmitted and sends a busy tone, thereby informing the refusal of the transmission to the person who transmitted.

When the CC 519 analyzes that the transmission is the emergency transmission at the stage at which all of the numbers are received, the CC 519 captures the B channel which has already temporarily been captured. The value corresponding to the B channel in the external line call state storage table is rewritten into the capture state from the temporary capture state. Further, the CC 519 controls the BRT 514 and performs the external line transmission and controls the TSW 517 and connects the audio channel between the extension which transmitted and the external line which transmitted. After that, when the partner responds, the speech communication is started.

A receiving procedure when there is a reception from the ISDN line will now be described. When there is a reception to the PBX 501 from the ISDN basic interface line 508, the BRT 514 detects the reception and notifies the reception to the CC 519. When the reception notification is received, the CC 519 refers to the external line call state storage table in the MM 518. When the number of free B channels of all of the ISDN lines is equal to or larger than 3, the reception is performed in accordance with the responding method. When the number of free B channels of all of the ISDN lines is equal to or smaller than 2, the BRT 514 is controlled and the reception is refused in order to keep the free B channel in a state for emergency.

The same shall also apply to the case where there is a reception to the PBX 501 from the ISDN primary digital stage interface line 509.

By keeping the two B channels of the ISDN line for the external line transmission for emergency by the transmitting procedure and receiving procedure as mentioned above, even if the calls of the PBX are congested in case of the occurrence of an emergency situation, the external line can be easily transmitted.

Although the preferred embodiments of the present invention have been described above, the invention is not limited to the foregoing embodiments but many modifications and variations are possible within the spirit and scope of the appended claims of the invention.

What is claimed is:

1. A private branch exchange apparatus coupled to a plurality of external lines and a plurality of extensions, comprising:

counting means for counting the number of external lines through which incoming calls are received or outgoing calls are generated;

decreasing means for decreasing the number when communication through the external lines is over; and refusing means for refusing the incoming call when the number is larger than a predetermined value.

2. An apparatus according to claim 1, wherein said refusing means refuses the reception call from an ISDN.

3. An apparatus according to claim 1, wherein the plurality of extensions are connected to telephones.

4. An apparatus according to claim 1, wherein said counting means includes increasing means for increasing the number based on an incoming call or an outgoing call, and decreasing means for decreasing the number based on an end communication.

5. A private branch exchange apparatus coupled to a plurality of external channels and a plurality of extensions, comprising:

memory means for storing a predetermined number;

discriminating means for detecting the number of external channels in a free state; and refusing means for refusing a generation call using a called party's number of other than the predetermined number stored in said memory means when said discriminating means detects that the number of external channels in the free state is less than a predetermined threshold value.

6. An apparatus according to claim 5, wherein said refusing means refuses the generation call in accordance with the number of external channels in the free state which was discriminated by said discriminating means.

7. An apparatus according to claim 5, wherein said discriminating means includes counting means for counting based on an outgoing call process.

8. An apparatus according to claim 5, wherein said discriminating means includes counting means for counting based on a receiving call.

9. An apparatus according to claim 5, wherein said discriminating means includes counting means for counting based on an incoming call reception.

10. An apparatus according to claim 5, wherein said refusing means refuses the generation call to an ISDN.

11. A method for restricting an incoming call in a private branch exchange apparatus coupled to a plurality of external lines and a plurality of extensions, comprising the steps of:

counting the number of external lines through which incoming calls are received or outgoing calls are generated;

decreasing the number when communication through the external lines is over; and restricting the incoming call when the number of calls is detected to be larger than a predetermined value.

12. A method according to claim 11, wherein the incoming call from an ISDN is restricted in said restricting step.

13. A method according to claim 11, wherein said counting step includes an increasing step of increasing the number based on an incoming call or an outgoing call, and a decreasing step of decreasing the number based on an end of communication.

14. A method of restricting an outgoing call in a private branch exchange apparatus having a memory for storing a predetermined number coupled to a plurality of extensions, comprising the steps of:

detecting the number of external channels in a free state; and restricting an outgoing call using a called party's number other than the predetermined number when the number of external channels in the free state is detected to be less than a predetermined threshold value.

15. A method according to claim 14, wherein said restricting step refuses a reception call in accordance with the number of external channels in the free state which was discriminated in said detecting step.

16. A method according to claim 14, wherein said detecting step includes a counting step of counting based on an outgoing call process.

17. A method according to claim 14, wherein said detecting step includes a counting step of counting based on a receiving call.

18. A method according to claim 14, wherein said detecting step includes a counting step of counting based on an incoming call reception.

19. A method according to claim 14, wherein the outgoing call to an ISDN is restricted in said restricting step.

* * * * *

UNITED STATES PATENT AND TRADEMARK OFFICE
CERTIFICATE OF CORRECTION

PATENT NO. : 5,956,392
DATED : September 21, 1999
INVENTOR(S) : Tanigawa et al.

It is certified that error appears in the above-identified patent and that said Letters Patent is hereby corrected as shown below:

Column 9, line 6, delete "(S220)" and insert therefor -- (S110) --.

Column 10, line 53, delete "ith" and insert therefor -- with --.

Signed and Sealed this

Twenty-seventh Day of March, 2001

Attest:

NICHOLAS P. GODICI

Attesting Officer

*Acting Director of the United States Patent and Trademark Office*